No. 877,726. PATENTED JAN. 28, 1908.
W. J. NORDLUND.
VEHICLE RIM.
APPLICATION FILED MAR. 4, 1907.

WITNESSES:
F. E. Maynard.

INVENTOR:
Walter J. Nordlund;
BY Geo. H. Strong.
ATTORNEY

UNITED STATES PATENT OFFICE.

WALTER J. NORDLUND, OF OAKLAND, CALIFORNIA.

VEHICLE-RIM.

No. 877,726.　　　　Specification of Letters Patent.　　　　Patented Jan. 28, 1908.

Application filed March 4, 1907. Serial No. 360,440.

*To all whom it may concern:*

Be it known that I, WALTER J. NORDLUND, citizen of the United States, residing at Oakland, in the county of Alameda and State of California, have invented new and useful Improvements in Vehicle-Rims, of which the following is a specification.

My invention relates to vehicle wheel-rims and especially those designed for use with automobiles or other carriages using inflatable tires. Its object is to provide a wheel rim which will permit a tire to be put on or taken off with a minimum amount of trouble and in the shortest possible time. It is quite a job ordinarily to dig out a heavy automobile tire from its rim or to put one on each time it is necessary to mend a puncture or put in a new inner tube.

The invention consists of the parts and the construction and combination of parts as hereinafter more fully described and claimed, having reference to the accompanying drawings, in which—

Figure 1:
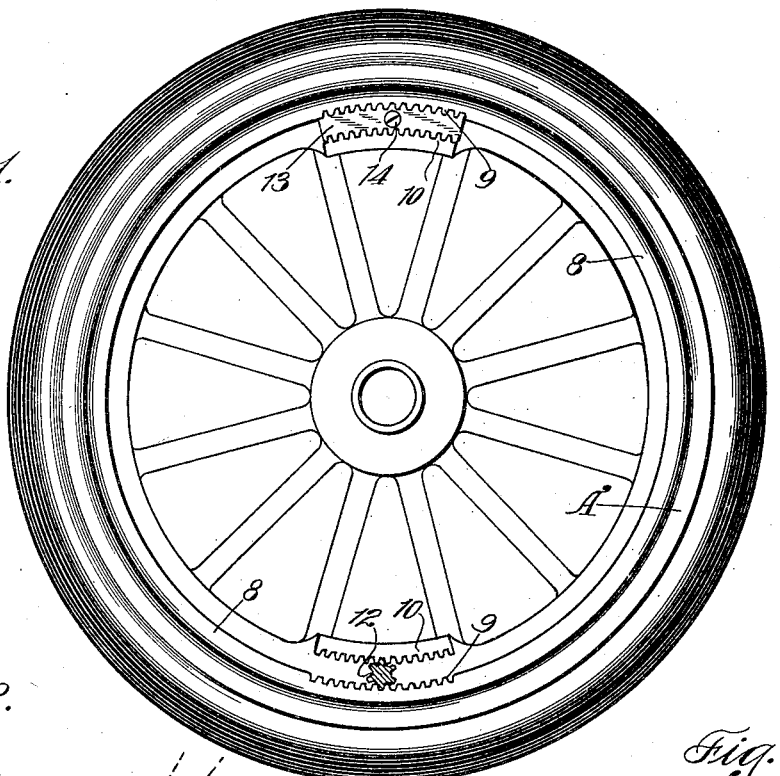
Figure 2:
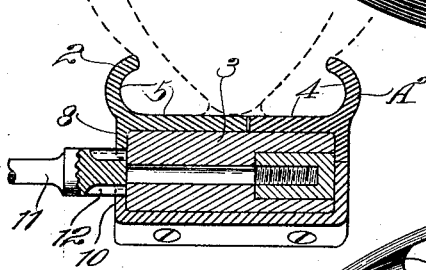
Figure 4:
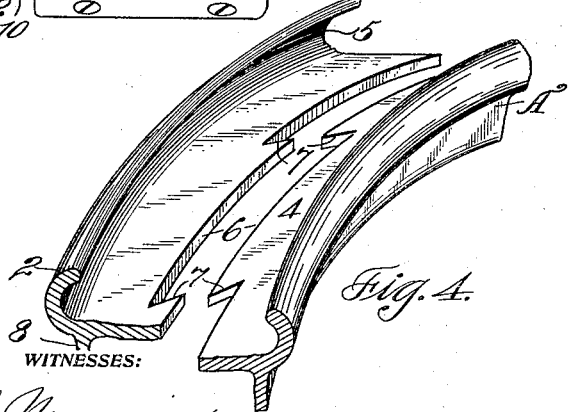
Figure 3:
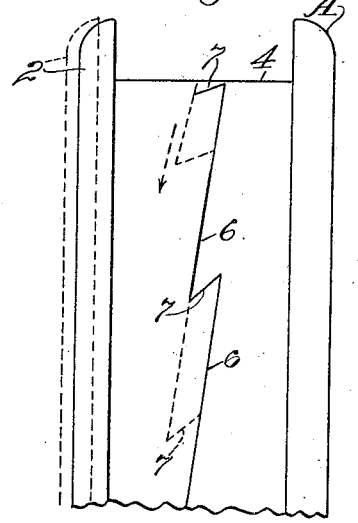

Figure 1 is a side elevation of a wheel of the improved form. Fig. 2 is a sectional view transversely of the rim. Fig. 3 is a diagrammatic view of the rim members, and Fig. 4 is a perspective portion of same.

In the embodiment of my invention I employ a rigid wheel rim section A and a removable rim section 2. The section A is permanently, or otherwise secured to the annular supporting rim 3, and is provided with the lateral annular flange 4 which is designed to support one side of the tire. Manifestly the part 3 and the fixed rim section A might be made integral. The removable rim section 2 is adapted to slip on and off of the rim 3 and carries an annular lateral flange 5 adapted to coöperate with the flange 4 in holding the tire in position when the parts are properly assembled.

The sections A—2 are provided with suitable interlocking means on their adjacent edges so that a spreading action of the rim will take place when one section is turned on its axis relative to the other section to allow the tire to be removed; and whereby on the turning of the movable section in the opposite direction, the flanges 4—5 are drawn towards each other to clamp and bind the tire. The means by which these sections are drawn together and interlocked, or spread apart, constitute the essential features of the present invention.

As here shown the adjacent edges of the two sections are formed with intermatching complementary wedges 6 with the undercut ledges 7. With the two sections laid face to face, a wedge on one section will abut against a corresponding wedge on the opposite section; if one section is turned relative to the other the movable section will either ride inward or outward on the cam surfaces or wedges of the stationary section to spread or contract the flanges 4—5. The under cut ends of the wedges or hooks 7 are also inclined so that opposed surfaces 7 will act cam-fashion and with a drawing action to draw the flanges 4—5 together. Thus it will be observed that the spreading of the sections to permit the removal of the tire is effected by the cams or wedges 6, and that the drawing together of the sections to clamp the tire is accomplished by the cam surfaces or hooks 7. Section 2 has both a rotative and a transverse or lateral movement with respect to section A.

The fixed female portion 3 of the rim simply serves as guide and support for the removable male section 2.

In order to facilitate the turning of the movable section to lock or unlock the tire, I provide the following simple means: The section 2 has an inside annular flange 8 to abut against the part 3, and this flange is provided with rack teeth at one or more points as indicated at 9 Fig. 1. The fixed part 3 or any other appropriate portion of the fixed part of the wheel is made with corresponding rack teeth 10, the rack teeth 9—10 being arranged in pairs and separated sufficiently to allow the insertion of a key as 11 having an appropriate pinion-shaped head 12. This pinion is adapted to engage both racks simultaneously so that by turning the key, it is a comparatively easy matter to rotate the section 2 in either direction with respect to the section A.

Any suitable means may be employed to lock the sections together. As here shown I use a segmental dowel plate 13 having edges or teeth to fit the teeth of the opposed racks 9—10 and being held in place by appropriate means as the screw 14.

In operation, to put on a tire: The section 2 is removed and the tire slipped on over section A to abut against the flange 4. The section 2 is then replaced, and worked under the tire, being careful to bring the opposed pairs of rack teeth 9—10 in proper juxtaposition. With the opposed cam surfaces 7 in contact, the sections are drawn together by inserting a key 11 between the racks 9—10 and turning the key so that the section 2 is given a rotative movement to cause the cam surfaces 7 on section 2 to ride inward on the opposed cam surfaces 7 on section A. This acts to draw the sections together and bind the flanges 4—5 against the tire. The dowel key 13 is then inserted and secured in position by the screw 14 or other suitable means. To remove the tire: The screw 14 and dowel key 13 are taken off, and the key 11 used to turn section 2 in a direction to separate the contiguous surfaces 7. This results in bringing the cam surfaces 6 into play to unlock the sections, spread flanges 4—5 and force section 2 off of the support 3.

The several opposed cam surfaces on the two sections are pitched so that in the natural travel of the wheel over the road-way, the points of the cam 7 on the two sections are driven constantly into the angle formed by the meeting lines of the cams 6—7 so that there will be no tendency from this source for the sections to spread.

Having thus described my invention, what I claim and desire to secure by Letters Patent, is—

1. A wheel rim comprising a fixed section and a movable section, said sections having opposed interlocking cam surfaces, and a rotatable member operable between the fixed and movable sections and engaging both sections whereby one section may be moved axially relative to the other section.

2. A wheel-rim comprising a fixed section and a movable section, said sections having opposed interlocking cam surfaces, a rack carried by the movable section, an opposed corresponding rack carried by a fixed part of the wheel-rim, and a key engaging said racks to rotate the movable section.

3. A wheel-rim comprising a fixed section and a movable section, said sections having opposed interlocking cam surfaces, a rack carried by the movable section, an opposed corresponding rack carried by a fixed part of the wheel-rim, a key engaging said racks to rotate the movable section, and a serrated-dowel-plate engageable with said racks to lock the sections against relative movement.

4. A wheel-rim comprising a fixed section and a movable section, said sections having corresponding opposed cam surfaces whereby on the rotation of one section relative to the other, the sections are drawn toward each other to clamp the tire, and means including a serrated-dowel-plate engageable with corresponding serrated parts located respectively on the movable section and on a fixed part of the wheel-rim to lock the two sections against relative movement.

In testimony whereof I have hereunto set my hand in presence of two subscribing witnesses.

WALTER J. NORDLUND.

Witnesses:
S. H. NOURSE,
FREDERICK E. MAYNARD.